United States Patent [19]
Okumura et al.

[11] Patent Number: 5,163,053
[45] Date of Patent: Nov. 10, 1992

[54] AUDIO SIGNAL DEMODULATION CIRCUIT

[75] Inventors: Naoji Okumura, Ibaraki; Toshihiro Miyoshi, Osaka; Yuichi Ninomiya; Yoshimichi Ohtsuka, both of Kawasaki; Tadashi Kawashima, Tokyo; Takushi Iwamoto, Matsuyama, all of Japan

[73] Assignees: Matsushita Electric Industrial Co., Ltd; Nippon Hoso Kyokai, both of Japan

[21] Appl. No.: 499,349

[22] PCT Filed: Oct. 14, 1989

[86] PCT No.: PCT/JP89/01088
§ 371 Date: Aug. 6, 1990
§ 102(e) Date: Aug. 6, 1990

[87] PCT Pub. No.: WO90/04890
PCT Pub. Date: May 3, 1990

[30] Foreign Application Priority Data
Oct. 24, 1988 [JP] Japan .................. 63-267451

[51] Int. Cl.⁵ ............................ G06F 11/10
[52] U.S. Cl. ........................ 371/31; 371/5.1
[58] Field of Search ............ 371/31, 38.1, 39.1, 371/37.1, 5.1, 5.4, 5.5, 2.1, 2.2; 360/22, 38.1, 48, 53

[56] References Cited
U.S. PATENT DOCUMENTS

| | | | |
|---|---|---|---|
| 4,206,406 | 6/1980 | Doi | 371/37.7 |
| 4,309,726 | 1/1982 | Tanaka | 360/32 |
| 4,799,221 | 1/1989 | Fukami | 371/40.2 |
| 4,943,964 | 7/1990 | Hatanaka | 371/31 |

FOREIGN PATENT DOCUMENTS

| | | |
|---|---|---|
| 53-48452 | 1/1978 | Japan . |
| 57-50308 | 3/1982 | Japan . |
| 60-55746 | 4/1985 | Japan . |
| 60-81936 | 5/1985 | Japan . |
| 61-35632 | 2/1986 | Japan . |

Primary Examiner—Robert W. Beausoliel
Attorney, Agent, or Firm—Mason, Fenwick & Lawrence

[57] ABSTRACT

An audio signal demodulating circuit comprises a counter circuit (11) for detecting the number of samples for which interpolation is to be successively made by counting the output from an error correction circuit (2) and an AND circuit 10 for taking the logical product of the output from the counter circuit and the mute signal generated when synchronization has been lost. If interpolation is to be successively made for m (integer) or more, an audio differential signal is muted using a mute signal so as to remove the signal with greatly deteriorated audio quality. This can remove large audio distortion generated if interpolation is only successively made for error correction when errors successively occur for samples.

4 Claims, 7 Drawing Sheets

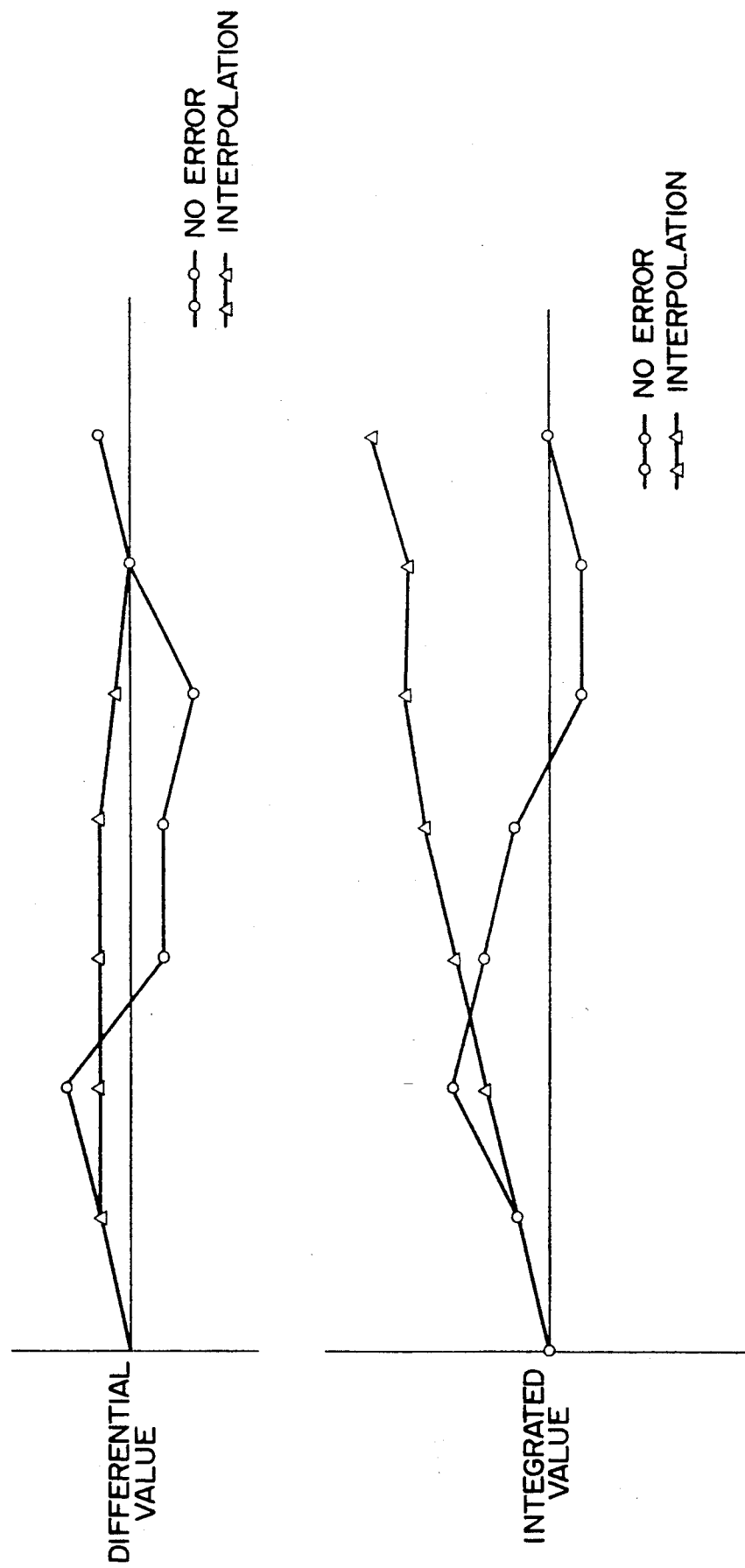

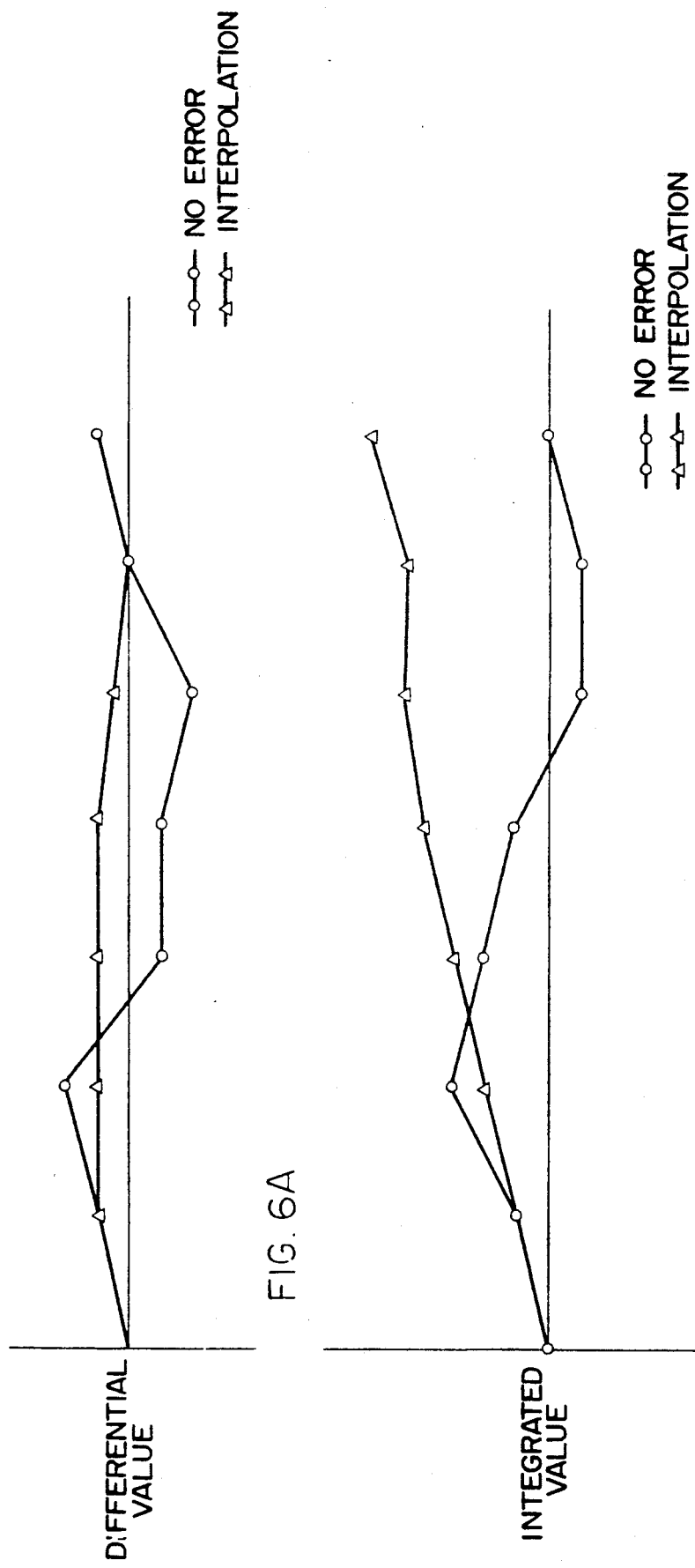

AUDIO SIGNAL DEMODULATION CIRCUIT

TECHNICAL FIELD

The present invention relates to an audio signal demodulation circuit for use in a high definition television broadcasting in the MUSE (Multiple Sub-Nyquist Sampling Encoding) transmission system.

BACKGROUND ART

In recent years, an audio signal demodulation circuit has been regarded as important as a circuit for demodulating PCM sound (audio signals) which is indispensable to high definition television broadcasting.

Now referring to the drawings, one example of the conventional audio signal demodulation circuits will be explained.

FIGS. 4, 5 and 6 are a block diagram of the conventional audio signal demodulation circuit, a timing chart thereof and a waveform chart thereof, respectively. In FIG. 4, 1 is a bit de-interleave circuit; 2 is an error correction circuit; 3 is a word de-interleave circuit; 4 is an expansion circuit; 5 is a range detection/error correction circuit; 6 is an interpolation circuit; 7 is an integration circuit; 8 is a synchronous detection circuit; and 9 is an AND circuit.

The operation of the audio signal demodulation circuit thus constructed will be explained with reference to FIGS. 5 and 6.

First, an audio input signal at 1350 kb/s is detected in its synchronization pattern by the synchronous detection circuit 8 to take synchronization. The output (FIG. 5(E)) from the synchronous detection circuit 8 is at a high level if the synchronization has been taken, while it is at a low level for a muting operation if the synchronization has not been taken.

Also the bit interleave of the input audio signal performed on the transmission side is de-interleaved by the bit de-interleave circuit 1. The output from the bit de-interleave circuit 1 is error-corrected by the error correction circuit 2 so that one-error correction two error detection is made in the normal mode and two-error correction three-error detection is made in the intensifying mode. The signal ((B) of FIG. 5) subjected to the two-error detection in the normal mode and the three-error detection in the intensifying mode will be used as an interpolation signal in the interpolation circuit 6.

The word interleave of the output of the error correction circuit 2 performed on the transmission side is de-interleaved by the word de-interleave circuit 3.

The output from the error correction circuit 2 is also detected in its range bits and error-detected by the range detection/error correction circuit 5.

The outputs from the word de-interleave circuit 3 and the range detection/error correction circuit 5 are expanded by the expansion circuit 4 using the range bits to produce a differential value. The output ((A) of FIG. 5) from the expansion circuit 4 is interpolated by the interpolation circuit 6 using the interpolation signal ((B) of FIG. 5) as follows:

$$X_{(i+1)} = X_{(i)} \cdots \frac{X_{(i+2)} = X_{(i)}}{X_{(i+n-1)} = X_{(i)}}$$

$$X_{(i+n)} = \frac{X_{(i)} + X_{(i+n-1)}}{2}$$

In the case where there are successive interpolation signals consisting of n (integer) samples from $X_{(i+1)}$ to $X_{(i+n)}$ for a certain channel, the n samples containing two errors in the normal mode and three errors in the intensifying mode are interpolated so that $(n-1)$ samples are interpolated for the previous value $X_{(i)}$ and the last sample are interpolated for the average value of $X_{(i)}$ and $X_{(i+n+1)}$ which contain no error ((C) of FIG. 5).

The output ((C) of FIG. 5) from the interpolation circuit 6 is muted by the AND circuit 9 using the mute signal ((E) of FIG. 5) output from the synchronous detection circuit so that the differential value when the synchronization has not been taken is zero ((H) of FIG. 5).

This differential value (H) from the AND circuit 9 is integrated by the integration circuit 7 to be demodulated as an audio signal.

The above arrangement thus constructed has the following defect. If three errors and two errors successively occur in the normal mode and the intensifying mode, respectively, the previous value is used for interpolation of the differential value. This increases distortion of the sound obtained and so greatly deteriorates the sound quality; the sound thus obtained cannot be heard as suitable sound by audiences.

DISCLOSURE OF INVENTION

An object of the present invention is to provide an audio signal demodulation circuit which can demodulate an audio signal as suitable sound for audiences by muting the audio signal if interpolating is to be successively made.

In order to attain the above object, the audio signal demodulation circuit according to the present invention comprises a counter circuit for detecting the number of samples for which interpolation is to be successively made by counting the output from an error correction circuit and one AND circuit for taking the logical product of the output from the counter circuit and the mute signal generated when synchronization has been lost.

In the arrangement of the present invention, the interpolation signal output from the error correction circuit is counted by the counter circuit, if interpolation is to be successively made for m or more samples, a mute signal is produced, and an audio differential signal is muted using the mute signal.

DESCRIPTION OF DRAWINGS

FIGS. 6A, 6B are waveform charts of the circuit of FIG. 4.

BEST MODE FOR CARRYING OUT THE INVENTION

Figure 1:
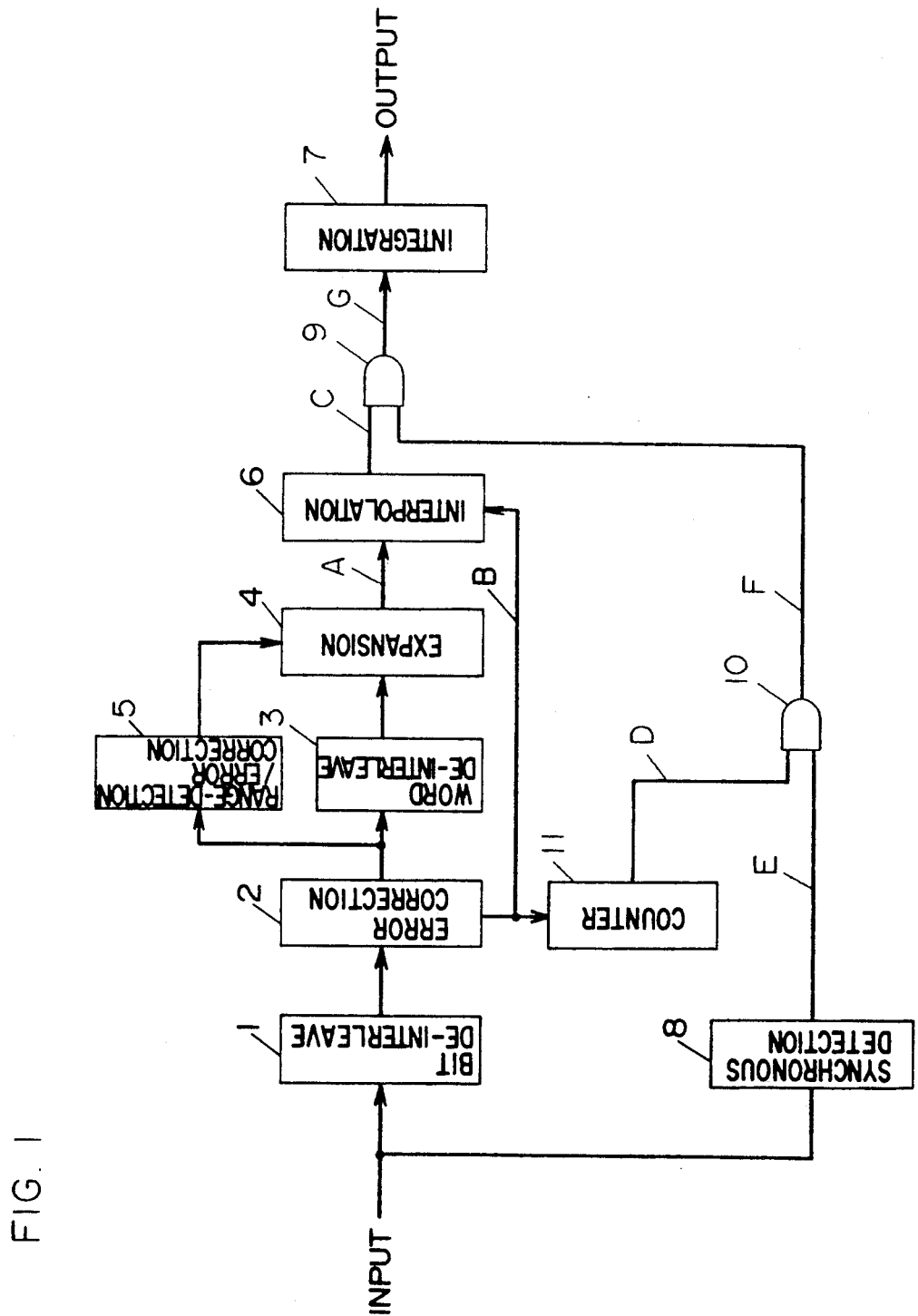
FIG. 1 is a block diagram of the audio signal demodulation circuit according to an embodiment of the present invention.

Now referring to the drawings, explanation will be given for the audio signal demodulation circuit according to one embodiment of the present invention. FIG. 1 is a block diagram of the audio signal demodulation circuit according to an embodiment of the present invention.

Figure 2:
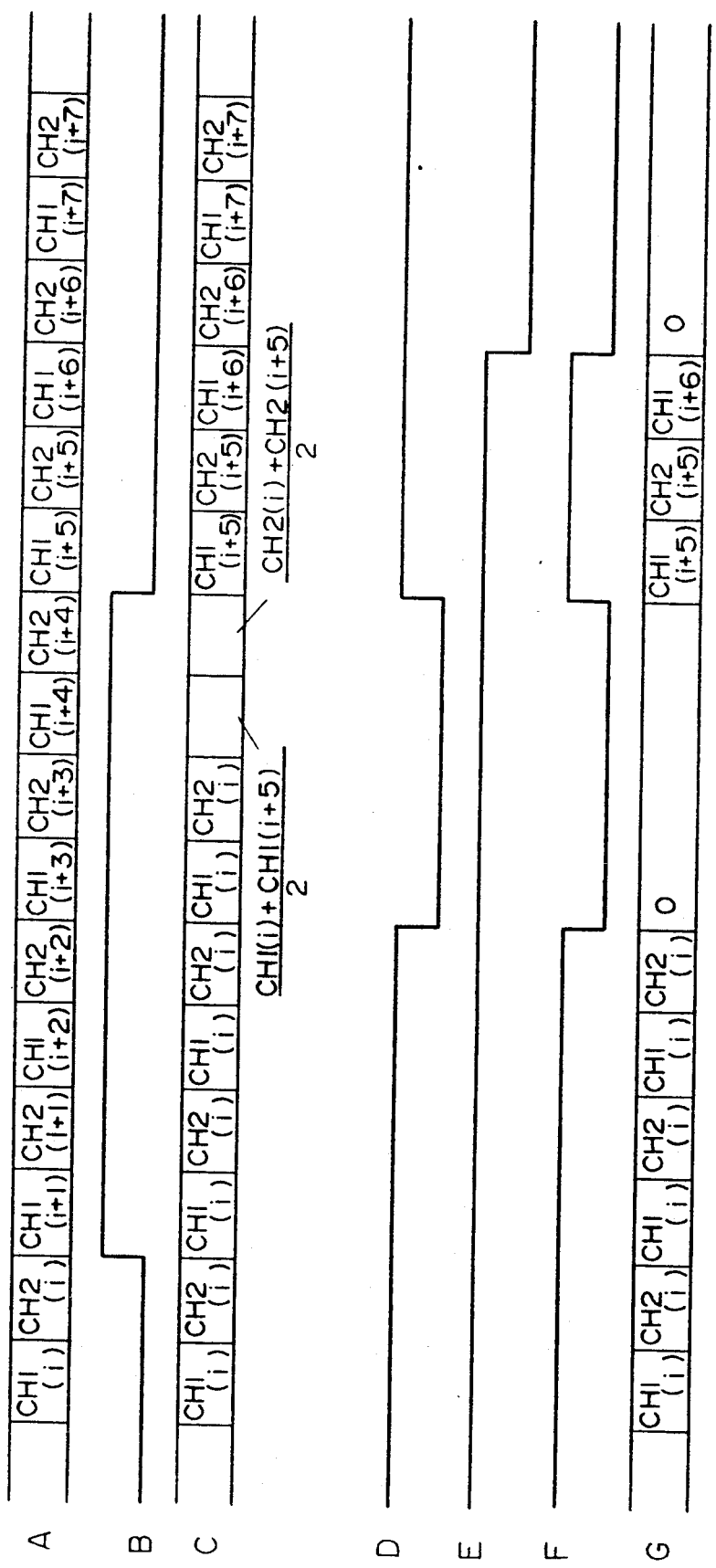
FIG. 2 is a timing chart of the circuit of FIG. 1.

FIG. 2 is a timing chart in the circuit of FIG. 1.

Figure 3:
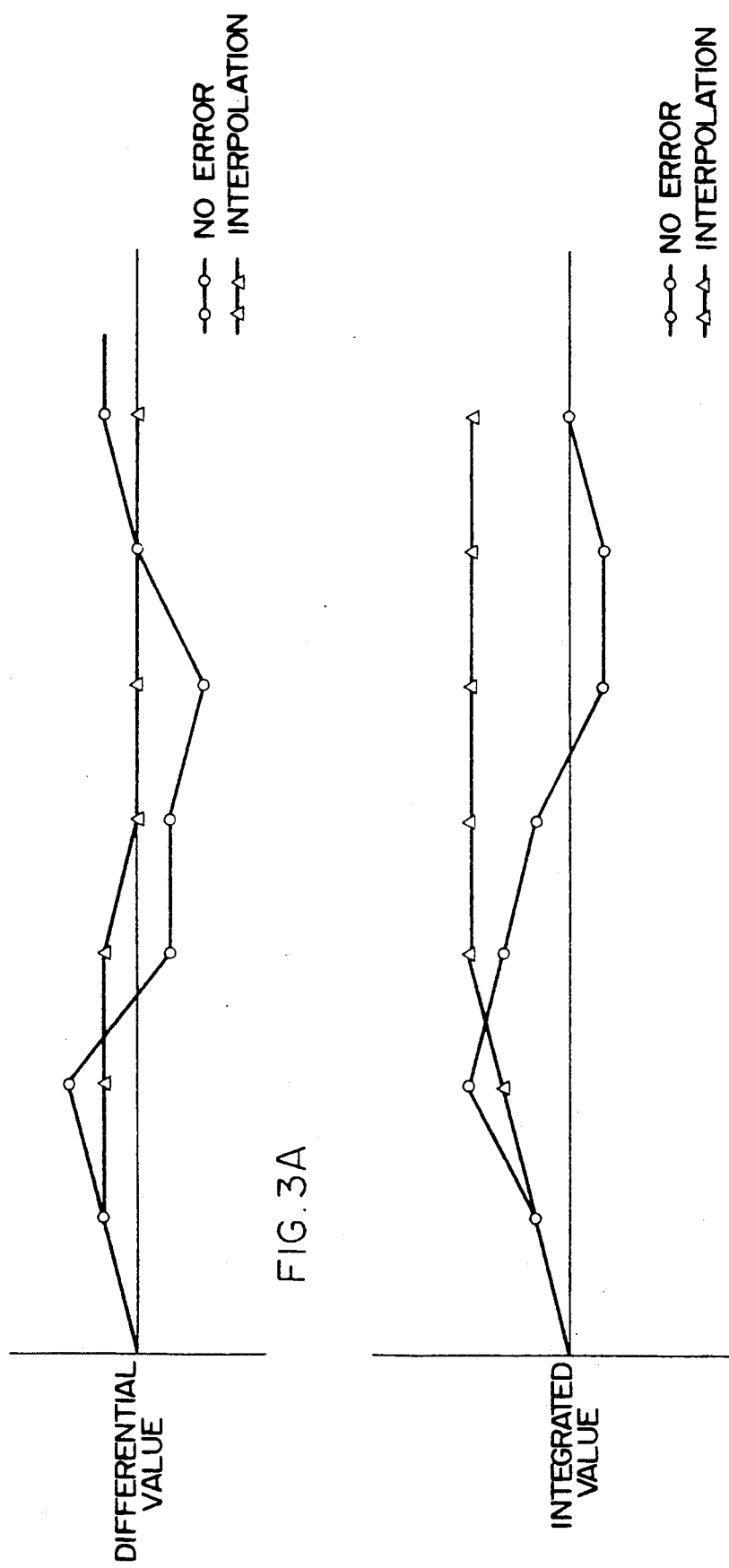
FIGS. 3A, 3B are waveform charts of the circuit of FIG. 1.

FIG. 3 is a waveform chart in the circuit of FIG. 1.

In FIG. 1, 1 is a bit de-interleave circuit; 2 is an error correction circuit; 3 is a word de-interleave circuit; 4 is an expansion circuit; 5 is a range detection/error correction circuit; 6 is an interpolation circuit; 7 is an integration circuit; 8 is a synchronous detection circuit; and 9 is an AND circuit. These circuit units are identical to the corresponding circuit units in FIG. 4.

Figure 4:
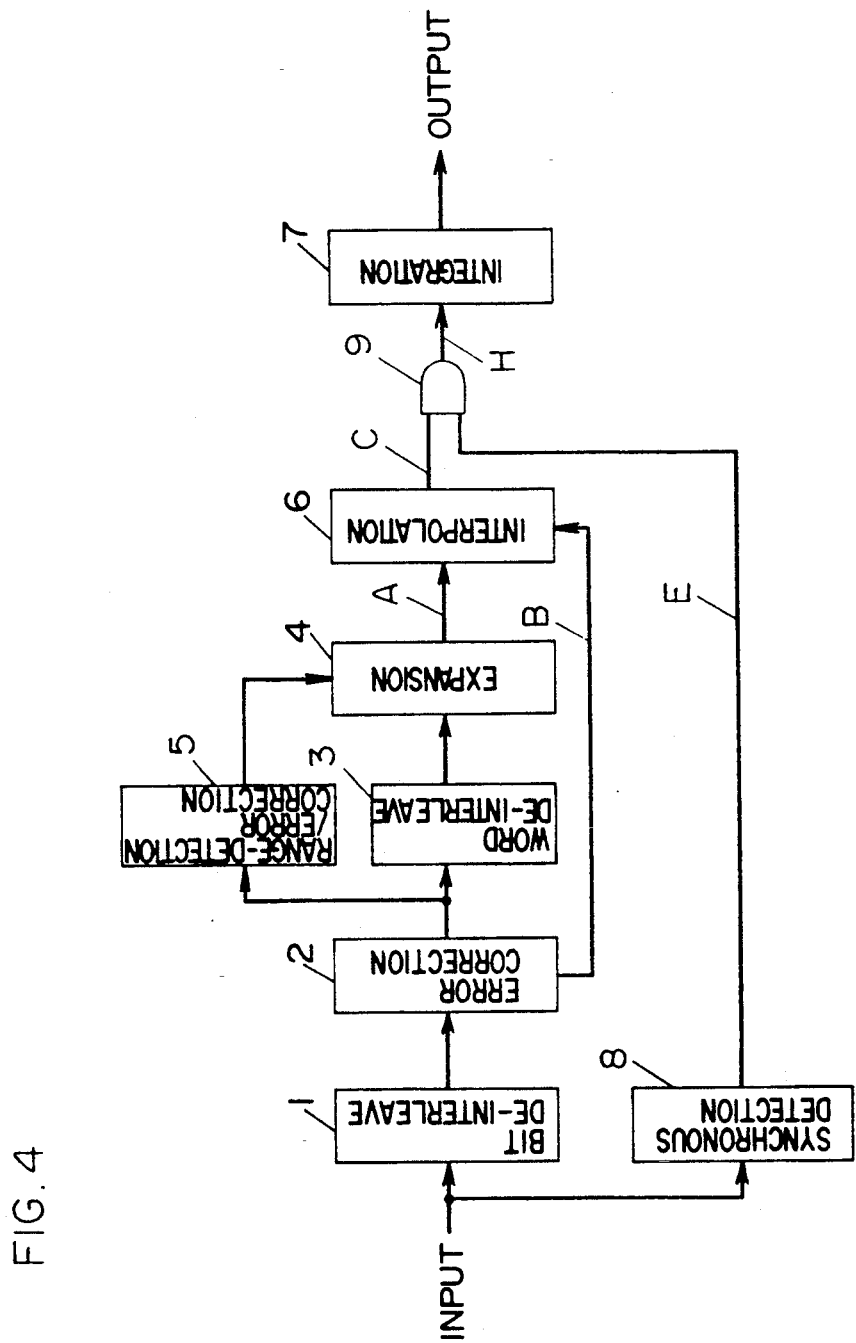
FIG. 4 is a block diagram of the conventional audio signal demodulation circuit.

The arrangement of FIG. 1 is different from that of FIG. 4 in provision of a counter circuit 11 for counting the interpolation signal output from the error correction circuit 2, and an AND circuit 10 for taking a logical product of the output from the counter circuit 11 and the mute signal output from the synchronous detection circuit 8, the output of the AND circuit 10 being used as one input to the AND circuit 9.

The operation of the audio signal demodulation circuit thus constructed will be explained with reference to FIGS. 1, 2 and 3.

First, an audio input signal is detected in its synchronization pattern by the synchronous detection circuit 8 to take synchronization. The output (FIG. 1(E)) from the synchronous detection circuit 8 is used for muting so that it is at a high level if the synchronization pattern has been detected while it is at a low level if the synchronization pattern has not been detected.

Also the input audio signal is canceled in its interleave performed on the transmission side by the bit de-interleave circuit 1. The output from the bit de-interleave circuit 1 is error-corrected by the error so that one-error correction two error detection is made in the normal mode and two-error correction three-error detection is made in the intensifying mode. The signal ((B) of FIG. 1) subjected to the two-error detection in the normal mode and the three-error detection in the intensifying mode will be used as an interpolation signal in the interpolation circuit 6.

The output from the error correction circuit 2 is canceled in its word interleave performed on the transmission side by the word de-interleave circuit 3.

The output from the error correction circuit 2 is also detected in its range bits and error-detected by the range detection/error correction circuit 5.

The outputs from the word de-interleave circuit 3 and the range detection/error correction 5 are expanded by the expansion circuit 4 using the range bits to produce a differential value. The differential value ((A) of FIG. 1) from the expansion circuit 4 is interpolated by the interpolation circuit 6 using the interpolation signal ((B) of FIG. 2) as follows:

In the case where there are successive interpolation signals consisting of n (integer) samples from $X_{(i+1)}$ to $X_{(i+n)}$ for a certain channel, the n samples containing two errors in the normal mode and three errors in the intensifying mode are interpolated so that (n−1) samples are interpolated for the previous value $X_{(i)}$ and the last sample are interpolated for the average value of $X_{(i)}$ and $X_{(i+n+1)}$ which contain no error ((C) of FIG. 2).

$$X_{(i+1)} = X_{(i)} \ldots \frac{X_{(i+2)} = X_{(i)}}{X_{(i+n-1)} = X_{(i)}}$$

$$X_{(i+n)} = \frac{X_{(i)} + X_{(i+n+1)}}{2}$$

Figure 5:
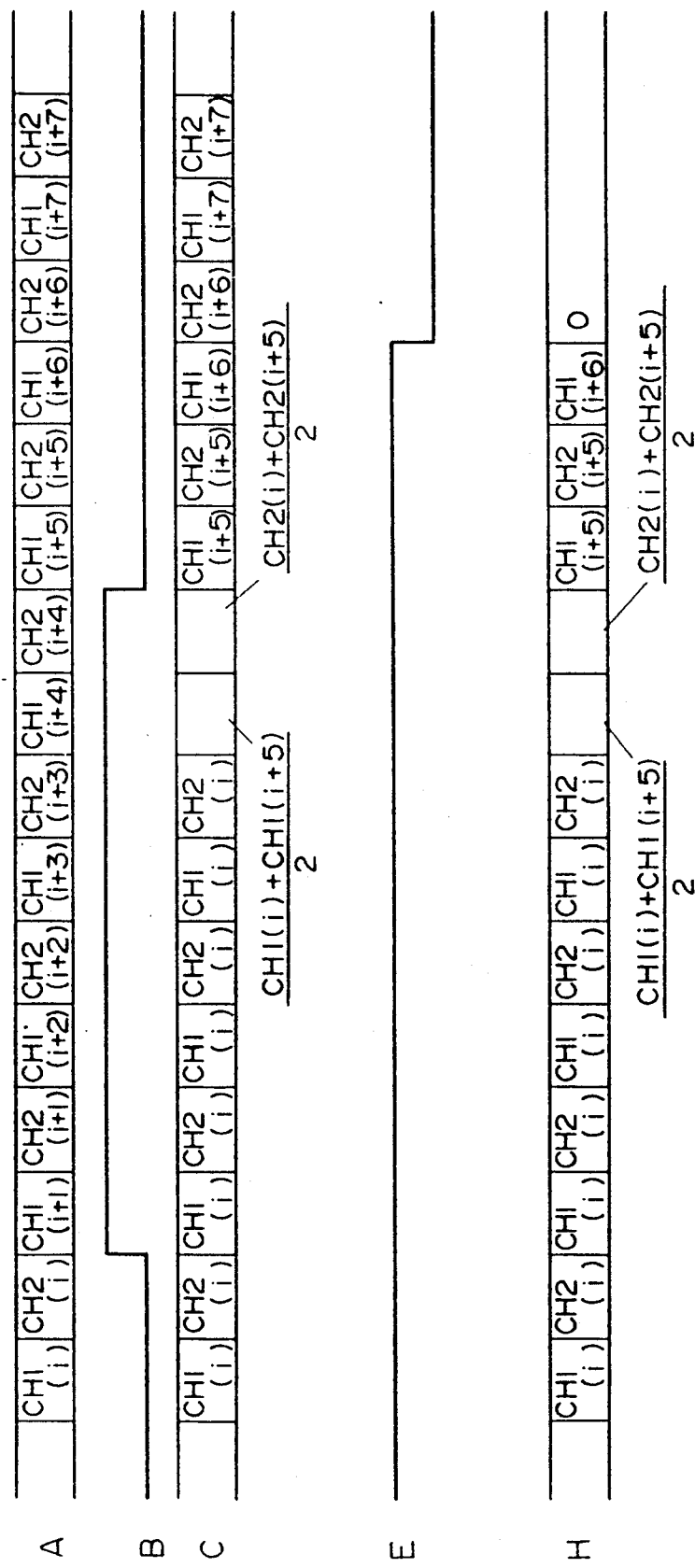
FIG. 5 is a timing chart of the circuit of FIG. 4.

The interpolation signal ((B) of FIG. 2) is counted by the counter circuit 11 so that the mute signal ((D) of FIG. 1) at a low level is produced if m (integer) or more successive errors occur. In (D) of FIG. 5, m=3.

The logical product of the output (D) from the counter circuit 11 and the output (E) from the synchronous detection circuit 8 is taken by the AND circuit 10 to produce a mute signal ((F) of FIG. 2). The output ((C) of FIG. 2) is muted by the AND circuit 9 using the mute signal (F) so that the differential value is zero ((G) of FIG. 2).

Finally, the differential value (G) is integrated by the integration circuit 7 to be demodulated as an audio signal.

INDUSTRIAL APPLICABILITY

In accordance with the present invention, there are provided a counter circuit for detecting the number of samples for which interpolation is to be successively made by counting the output from an error correction circuit and one AND circuit for taking the logical product of the output from the counter circuit and the mute signal generated when synchronization has been lost, and using these circuit units, the differential value is muted if interpolation is to be successively made. Thus, the sound with large distortion and greatly deteriorated sound quality can be restricted so that an audio signal can be demodulated as suitable sound as audiences.

We claim:

1. An audio signal demodulation circuit comprising:
input means for receiving an audio input signal having a bit interleave;
a bit de-interleave circuit receiving said audio signal and producing a de-interleave signal that results from canceling the bit interleave of said audio signal;
an error correction circuit receiving said de-interleave signal and producing first and second error signals resulting from correcting an error in said de-interleave signal;
a word de-interleave circuit receiving said first error signal and producing a second de-interleave signal by canceling a word interleave found in said first error signal;
a detection and correction circuit receiving said second de-interleave signal and producing a third error signal resulting from range-detecting and error-detecting said first error signal, said third error signal having range bits;
an expansion circuit receiving said second de-interleave signal and said third error signal and producing an expansion signal resulting from utilizing said range bits to expand said second de-interleave signal;
an interpolation circuit receiving said expansion signal and producing an interpolation output signal resulting from utilizing said second error signal to interpolate said expansion signal;
a counter circuit for producing a count signal resulting from counting errors in said second error signal;
a synchronous detection circuit for producing a mute signal resulting from synchronization detecting said audio input signal;
first logic means for producing a first logic signal that results from taking a logical product of said count signal and said mute signal;
second logic means for producing a second logic signal that results from taking a logical product of said interpolation output signal and said first logic signal; and an integration signal for integrating said second logic signal to produce an audio output signal.

2. The demodulation circuit of claim 1, wherein said first logic means is an AND gate.

3. The demodulation circuit of claim 1, wherein said second logic means is an AND gate.

4. The demodulation circuit of claim 1, wherein said error correction circuit operates in normal and intensifying modes, one-error correction two-error detection taking place in said normal mode and two-error correction three-error detection taking place in said intensifying mode.

* * * * *